US011919529B1

(12) United States Patent
Venkatraman et al.

(10) Patent No.: US 11,919,529 B1
(45) Date of Patent: Mar. 5, 2024

(54) EVALUATING AUTONOMOUS VEHICLE CONTROL SYSTEM

(71) Applicant: Aurora Innovation, Inc., Palo Alto, CA (US)

(72) Inventors: Arun Venkatraman, Mountain View, CA (US); James Andrew Bagnell, Pittsburgh, PA (US); Haoyang Fan, Redwood City, CA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 88 days.

(21) Appl. No.: 17/137,095

(22) Filed: Dec. 29, 2020

Related U.S. Application Data

(60) Provisional application No. 63/013,265, filed on Apr. 21, 2020.

(51) Int. Cl.
*B60W 50/04* (2006.01)
*B60W 50/00* (2006.01)
*B60W 50/08* (2020.01)
*G06F 17/18* (2006.01)
*G07C 5/08* (2006.01)

(52) U.S. Cl.
CPC ........ *B60W 50/045* (2013.01); *B60W 50/085* (2013.01); *G07C 5/0841* (2013.01); *B60W 2050/0075* (2013.01); *B60W 2556/10* (2020.02); *G06F 17/18* (2013.01)

(58) Field of Classification Search
CPC ............. B60W 50/045; B60W 50/085; B60W 2556/10; B60W 2050/0075; G07C 5/0841; G06F 17/18
See application file for complete search history.

(56) References Cited

U.S. PATENT DOCUMENTS

| | | | |
|---|---|---|---|
| 11,034,361 B2* | 6/2021 | Boss | B60W 50/0097 |
| 2016/0285700 A1 | 9/2016 | Gopalakrishnan et al. | |
| 2017/0286845 A1 | 10/2017 | Gifford et al. | |
| 2018/0118219 A1* | 5/2018 | Hiei | B60W 50/14 |
| 2019/0009794 A1* | 1/2019 | Toyoda | B60W 50/12 |
| 2019/0049967 A1 | 2/2019 | Lim et al. | |

(Continued)

FOREIGN PATENT DOCUMENTS

WO 20170115940 7/2017

OTHER PUBLICATIONS

Carvalho, A. M. (2016). Predictive control under uncertainty for safe autonomous driving: Integrating data-driven forecasts with control design. University of California, Berkeley. (Year: 2016).*

(Continued)

*Primary Examiner* — Aniss Chad
*Assistant Examiner* — Stephanie T Su
(74) *Attorney, Agent, or Firm* — Gray Ice Higdon

(57) ABSTRACT

Techniques are disclosed for evaluating an autonomous vehicle ("AV") control system by determining deviations between data generated using the AV control system and manual driving data. In many implementations, manual driving data captures action(s) of a vehicle controlled by a manual driver. Additionally or alternatively, multiple AV control systems can be evaluated by comparing deviations for each AV control system, where the deviations are determined using the same set of manual driving data.

19 Claims, 5 Drawing Sheets

(56) References Cited

U.S. PATENT DOCUMENTS

| | | | |
|---|---|---|---|
| 2019/0161080 A1 | 5/2019 | Gochev et al. | |
| 2019/0318206 A1 | 10/2019 | Smith et al. | |
| 2020/0089246 A1* | 3/2020 | McGill, Jr. | G05D 1/0214 |
| 2020/0269875 A1 | 8/2020 | Wray et al. | |
| 2020/0387156 A1 | 12/2020 | Xu et al. | |
| 2021/0191394 A1* | 6/2021 | Dudley | G05D 1/0061 |
| 2022/0188624 A1 | 6/2022 | Kuehnle et al. | |

OTHER PUBLICATIONS

Bansal et al; ChauffeurNet: Learning to Drive by Imitating the Best and Synthesizing the Worst; Dec. 7, 2018, 20 pages.

Gao et al; VectorNet: Encoding HD Maps and Agent Dynamics from Vectorized Representation; May 8, 2020, 9 pages.

Haan et al; Causal Confusion in Imitation Learning, 33rd Conference on Neural Information Processing Systems (NeurIPS 2019), Vancouver, Canada, 12 pages.

Codevilla et al; Exploring the Limitations of Behavior Cloning for Autonomous Driving, 2019, 10 pages.

Google AL Blog; A Novel Neural Network Architecture for Language Understanding, Aug. 31, 2017, 9 pages.

Kumar et al; Interaction-Based Trajectory Prediction Over a Hybrid Traffic Graph; Sep. 27, 2020, 12 pages.

International Searching Authority; Search Report and Written Opinion for PCT Application No. PCT/US2021/063989; 17 pages; dated Apr. 14, 2022.

International Searching Authority; Search Report and Written Opinion for PCT Application No. PCT/US2021/064022; 14 pages; dated Apr. 11, 2022.

Berlincioni, Lorenzo et al; Multiple Future Prediction Leveraging Synthetic Trajectories; Oct. 18, 2020; 8 pages.

Makansi, Osama et al; Overcoming Limitations of Mixture Density Netowrks: A Sampling and Fitting Framework for Multimodal Future Prediction; Jun. 8, 2020; 18 pages.

Boulton, Freddy A., et al; Motion Prediction Using Trajectory Sets and Self-Driving Domain Knowledge; Jun. 8, 2020; 12 pages.

Zhang, Lingyao et al; Map-Adaptive Goal-Based Trajectory Prediction; Nov. 14, 2020; 14 pages.

Liang, Junwei et al; The Garden of Forking Paths: Towards Multi-Future Trajectory Prediction; Jun. 13, 2020; 12 pages.

United States Patent and Trademark Office, Non-Final Office Action for U.S. Appl. No. 17/137,100 dated Jul. 11, 2022, 46 pages.

* cited by examiner

EVALUATING AUTONOMOUS VEHICLE CONTROL SYSTEM

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0. With Level 1 autonomy, a vehicle controls steering or speed (but not both), leaving the operator to perform most vehicle functions. With Level 2 autonomy, a vehicle is capable of controlling steering, speed, and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only under certain conditions such as only in certain types of roads (e.g., highways) or only in certain geographic areas (e.g., a geofenced metropolitan area which has been adequately mapped). Finally, Level 5 autonomy represents that a vehicle is capable of operating without operator input under all conditions.

A fundamental challenge to any autonomy-related technology relates to collecting and interpreting information about an autonomous vehicle's surrounding environment, along with planning and executing commands to appropriately control vehicle motion to appropriately navigate the vehicle through its current environment. Therefore, continuing efforts are being made to improve each of these aspects, and by doing so autonomous vehicles increasingly are able to appropriately and reliably operate in increasingly complex environments and accommodate both expected and unexpected interactions within an environment. It is a further goal to ensure that the autonomous vehicle operates in a manner which is consistent with a vehicle that is manually driven by a person.

SUMMARY

Techniques disclosed herein are directed towards evaluating an autonomous vehicle ("AV") control system (e.g., at least a planning system portion of the AV control system) using manual driving data. The manual driving data is captured while a vehicle is manually driven in a conventional mode. In some implementations, the manual driving data can be used to determine how close the manual operations are to operations by the AV control system. The conventional mode means a status of a vehicle when the vehicle is under active physical control of a natural person sitting in a driver's seat operating the vehicle. The planning system portion of the AV control system (also referred to herein as the planning system, the planning subsystem, etc.) can be evaluated by identifying deviations between aspect(s) of a vehicle trajectory driven in the conventional mode and a corresponding aspect(s) of a vehicle trajectory determined using the planning system. Such deviations may represent that the AV control system has predicted a trajectory that would not be utilized in the conventional mode. These deviations also may act as markers for identifying cost functions where the cost functions are used by the AV control system to generate AV predicted trajectories that may require update or modification. For example, a current instance of manual driving data can be processed using the planning system to determine a predicted next instance of AV control system trajectory data such as a path for the AV, a route for the AV, a trajectory for the AV, and/or additional trajectory planning output used in controlling the AV. This predicted next instance of AV control system trajectory data can be compared with a next instance of manual driving data (e.g., the instance of manual driving data following the current instance of manual driving data) to determine a difference (also referred to herein as a difference measure) between the predicted next instance of AV control system trajectory data and the next instance of manual driving data. In other words, given the same starting information (i.e., the current instance of manual driving data), difference(s) can be determined between the manual driver's actions (i.e., the next instance of manual driving data) and the AV's actions (i.e., the predicted next instance of AV control system trajectory data generated using the AV control system based on the current instance of manual driving data).

In a variety of implementations, the difference can be processed to determine whether there is a statistically significant deviation between the predicted next instance of AV control system trajectory data and the next instance of manual driving data. Not all differences between the predicted next instance of the AV control system trajectory data and the next instance of manual driving data should be considered statistically significant in the evaluation of the planning system. What is considered a statistically significant difference can be dependent on what features of a trajectory are being considered (e.g., jerk, steering angle rate, velocity, acceleration, direction, position, etc.), and/or a combination of driving conditions being considered (e.g., stopped at a traffic light, coming to a stop at a stop sign, driving on a city street, driving on the highway, changing lanes in front of another vehicle, and/or additional driving condition(s)).

Identified deviations can be utilized in evaluating the AV control system. For example, an evaluation metric can indicate the number of deviations, the percentage of deviations, and/or additional metric(s). Furthermore, multiple AV control systems can be compared by evaluating each control system using the same (or substantially similar) set of manual driving data. For example, an AV control system version 5.0 can be evaluated using a set of manual driving data. AV control system version 5.1 can similarly be evaluated using the same set of manual driving data, where one or more portions of AV control system 5.0 are changed in AV control system 5.1. Evaluations of both AV control systems can provide, for example, an indication of whether the changes made in AV control system 5.1 have improved the AV system such that trajectories predicted by the AV control system are close to what a manual driver would want to do.

In many implementations, a set of manual driving data can be captured where the vehicle is driven by a manual driver who is an objectively good driver (e.g., the driver behaves in an expected manner). Evaluating the AV control system using the set of manual driving data where the manual driver is an objectively good driver can provide an indication of whether the AV control system is objectively good (e.g., the AV control system behaves in an expected manner). Additionally or alternatively, an updated version of the AV control system can be evaluated using a set of manual driving data in simulation, which can ensure the updated version of the AV control system behaves as anticipated before deploying the AV control system in real autonomous vehicle(s) driving on the road.

In some implementations, an AV controls system can generate a distribution of the probabilities of candidate trajectories for an AV based on the current state of the vehicle along with the current state of the environment of the vehicle. The AV control system can then select a trajectory to use in controlling the AV, for example, by selecting the trajectory in the distribution with the highest probability (e.g., by selecting the highest point in the distribution curve). However, trajectory selection by the AV control system must also take into account environmental constraints related to the state of the vehicle as well as the state of the world around the vehicle. Cost functions allow the control system to take such constraints into consideration when selecting possible trajectories. One or more cost functions can be utilized by the AV control system to alter the possible trajectories, thus altering the probabilities of selecting candidate trajectories. Cost function(s) can make certain actions more expensive (e.g., by decreasing their probability), and conversely can make certain actions less expensive (e.g., by increasing their probability), and are functions of current vehicle parameter(s) and/or current environmental parameter(s). For example, a cost function can be related to the distance an AV drives from a curb, where the cost function makes it less expensive to control the AV to drive in the middle of a lane away from the curb and more expensive to control the AV to drive next to the curb. As another example, a cost function can be related to controlling an AV when the AV is approaching a green traffic light, where the cost function makes it more expensive to increase the acceleration of the AV as it approaches the traffic light and less expensive to keep the AV at a constant acceleration as it approaches the traffic light. Conversely, a cost function related to controlling the AV when the AV is approaching a red traffic light can make a trajectory expensive which increases acceleration of the AV and less expensive to decelerate the AV. In some implementations, an AV cost function can be related to multiple driving conditions, such as a cost function related to approaching a traffic light in rainy weather at night.

In some of those implementations, based on a current instance of manual driving data, the AV control system can determine next predicted AV control system trajectory data using a distribution of candidate trajectories. Further, the system can determine whether there is a deviation between the corresponding next instance of manual driving data and the AV control systems calculated next distribution of candidate trajectories. For example, the system can determine if there is a deviation when the manual driving data is more than one standard deviation away from the mean of the distribution of candidate trajectories. In other words, there is no deviation as long as the manual driving data is close enough to the mean of the distribution. Conversely, when the manual driving data is not close enough to the mean of a projected candidate trajectory distribution, a deviation may be identified which can indicate one or more cost functions used to shape the distribution may need to be adjusted. Further, comparison between manual driving data and projected candidate trajectories may identify possible costs afforded by a manual driver in trajectory planning that have not been accounted for in the AV planning system.

In many implementations, an instance of manual driving data can include current vehicle trajectory data capturing one or more aspects of the trajectory of the corresponding instance, such as position, speed, and/or additional parameters of the trajectory of the vehicle. Such instance of manual driving data may also include corresponding current environmental data capturing aspects of the environment for the current instance, such as data captured using a sensor suite of the vehicle while the vehicle is driven by the manual driver including camera data, LIDAR data, RADAR data, and/or additional vehicle data. Correspondingly, in various implementations, the data space of the AV control system includes data utilized by the AV control system to control of the AV such as jerk, steering angle rate, and/or other parameter(s). Without additional processing, noise can be introduced into data when deriving jerk from vehicle position and/or speed data of a manual driver. The manual driving data can be processed using a vehicle dynamics model to transform the manual driving data into the data space of the AV control system. In some implementations, a vehicle dynamics model can reduce and/or remove noise introduced by taking derivatives of the manual driving data by smoothing the data.

A manual driver may have slower reactions to changes in the environment (e.g., a traffic light changing colors, a pedestrian stepping into a crosswalk, etc.) than an AV control system. For example, a manual driver may take longer to apply the brake and begin slowing a vehicle in response to a seeing a traffic light change to yellow as compared to the amount of time taken by an AV control system to begin slowing a vehicle in response to determining the traffic light has changed to yellow. This can be due to, for example, the AV control system (e.g., a perception system thereof) being able to detect a change in the traffic light more quickly than a human can in some situation(s). In a variety of implementations, this latency (i.e., the length of time it takes a human to react to the environment) can be utilized to offset instance(s) of manual driving data. For example, the likelihood of manual driving action(s) can be determined given one or more AV self-driving actions (e.g., processing manual driving action(s) and AV action(s) using a log likelihood process). Peaks in the likelihood data can provide an indication of an incorrectly offset latency (i.e., the manual driving action is compared with the incorrect corresponding AV action). In many implementations, the likelihood of a manual driving action can be determined based on several given AV self-driving actions, where each given AV self-driving action corresponds with a candidate latency. For example, the likelihood of an instance of manual driving data can be determined given an instance of AV data indicating a 0.25 second latency (e.g., an AV driving action 0.25 seconds in the past), given an instance of AV data indicating a 0.5 second latency (e.g., an AV driving action 0.5 seconds in the past), given an instance of AV data indicating a 1.0 second latency (e.g., an AV driving action 1.0 seconds in the past), and/or given an instance of AV data indicating additional and/or alternative latency. In a variety of implementations, a determined latency can be used to offset the manual driving data (i.e., comparing predicted AV action(s) using corresponding manual operation(s) offset by the latency). Offsetting the data based on latency can reduce the occurrence of falsely identified deviations, where a deviation is identified for AV action(s) where no deviation would be identified if the AV action(s) were compared with different corresponding manual operation(s) which take into account the slower reaction time of the manual driver. Additionally or alternatively, manual driver latency can be a dynamic value that changes over time. One or more portions of the manual driving data can be offset by a first latency, one or more portions of the manual driving data can be offset by a second latency, one or more portions of the manual driving data can be offset by a third latency, etc. In some implementations, the manual driving latency can be determined for each instance of manual driving data by determining a likelihood each instance of manual driving data is generated given several instances of AV data and determining the latency corresponding to each instance of manual driving data based on the corresponding likelihoods.

Accordingly, various implementations set forth techniques for evaluating AV control systems using manual driving data—and do so in a manner that enables the reuse of the manual driving data. Evaluating an AV control system by allowing the AV to drive in the real world based on AV control signal(s) generated by the AV control system is expensive (e.g., real world evaluation utilizes fuel, battery power, wear and tear on vehicle components, computing resources, and/or additional resources). Similarly, evaluating an AV control system by simulating the AV driving using control signals generated by the AV control system is computationally expensive (e.g., utilizing processor cycles, memory, battery power, and/or additional resources of a computing system). Implementations disclosed herein enable evaluating many AV control systems utilizing the same set (or substantially similar, such as 90% or more of the same) of manual driving data, eliminating the need to test each iteration of an AV control system in the real world and/or in simulation.

In some implementations, multiple cost functions may be used to shape or move the probability distribution of predicted AV control system trajectory data, where at least one of the cost functions is erroneously shaping or moving the probability distribution of the predicted AV control system trajectory data. However, in some of those implementations, there is no statistically significant difference between the manual driving data and the probability distribution of the predicted AV control system trajectory data despite the erroneous cost function(s). In other words, when multiple cost functions are used to shape or move a probability distribution of candidate AV trajectory data, the group of cost functions as a whole can compensate for one or more suspect cost functions erroneously moving or shaping of the probability distribution. In these situations, since the manual driving data is close enough to the predicted AV control system trajectory data despite the suspect cost function(s), the suspect cost function(s) may not be changed thus conserving computing resources (e.g., power, memory, processor cycles, etc.) that would otherwise be used to change the suspect cost function(s). The method and system may also provide the ability to identify a possible cost function which requires an update without modifying the manual driving data. By direct comparison of the manual driving data to the predicted AV control system trajectory data, resources may be conserved due to utilizing little or no processing of the manual driving data set while identifying possible cost functions that require update or modification.

The above description is provided as an overview of various implementations disclosed herein. Those various implementations, as well as additional implementations are described in more detail herein. In implementations, a method is disclosed implemented by one or more processors for evaluating autonomous vehicle control systems. The method may include, for each of a plurality of iterations, identifying a corresponding current instance of manual driving data. The corresponding instance of manual driving data represents data previously captured during control of a corresponding vehicle by a corresponding manual driver and comprising corresponding current vehicle trajectory data that defines one or more aspects of the trajectory of the corresponding vehicle for the corresponding current instance. The current instance of manual driving data previously captured may also include corresponding current environmental data that defines one or more aspects of an environment of the corresponding vehicle for the corresponding current instance. The method can further include processing the corresponding current instance of the manual driving data and, using the autonomous vehicle control system, generating a corresponding predicted next instance of autonomous vehicle control system trajectory data. The generated predicted next instance of vehicle control trajectory data defines one or more aspects of a trajectory that would be implemented by the autonomous vehicle control system in view of the current instance of manual driving data. The method further includes comparing (a) the corresponding predicted next instance of autonomous vehicle control system trajectory data to (b) a corresponding next instance of manual driver trajectory data, the corresponding next instance of manual driver trajectory data being previously captured during the control of the corresponding vehicle by the corresponding manual driver. The method also includes that following the corresponding current instance of manual driving data, determining a difference measure based on the comparing and evaluating the autonomous vehicle control system based on the difference measure from the plurality of iterations.

These and other implementations of the technology can include one or more of the following features.

In some implementations the method may also include determining, based on the evaluating of the autonomous vehicle control system, whether to deploy the autonomous vehicle control system in one or more autonomous vehicles.

In other implementations, the method includes, for each of a plurality of additional iterations, identifying the corresponding current instance of manual driving data and processing the corresponding current instance of manual driving data. The method further includes using an additional autonomous vehicle control system to generate an additional corresponding predicted next instance of additional autonomous vehicle control system trajectory data defining one or more aspects of an additional trajectory that would be implemented by the additional autonomous vehicle control system in view of the current instance of manual driving data. Once processed, the method further includes comparing (a) the additional corresponding predicted next instance of additional autonomous vehicle control system trajectory data to (b) the corresponding next instance of manual driver trajectory data, wherein the corresponding next instance of manual driver trajectory data was previously captured during the control of the corresponding vehicle by the corresponding manual driver. The method further includes that following the corresponding current instance of manual driving data, determining an additional difference measure based on such comparing and then evaluating the additional autonomous vehicle control system based on the additional difference measure from the additional plurality of iterations.

In further implementations, the corresponding current environment data that defines one or more aspects of the environment of the corresponding vehicle for the current instance includes sensor data captured using a sensor suite of the corresponding vehicle. In addition or alternatively, the corresponding current vehicle trajectory data that defines the one or more aspects of the trajectory of the corresponding vehicle for the current instance includes one or more aspects of the trajectory of the corresponding vehicle for one or more previous instances. In even further variations, the corresponding current environmental data that defines the one or more aspects of the environment of the corresponding vehicle for the current instance includes one or more aspects of the environment of the corresponding vehicle for one or more previous instances.

In even further implementations, the method may include determining whether to classify the corresponding predicted next instance of autonomous vehicle control system trajectory data as a deviation based on the difference measure. In some of these implementations, the method may additionally or alternatively include one or more of the following features. The corresponding predicted next instance of autonomous vehicle control system trajectory data may be a predicted next instance of autonomous vehicle control system trajectory Gaussian distribution. Optionally, the method may additionally include determining whether to classify the corresponding predicted next instance of autonomous vehicle control system trajectory data as a deviation based on the difference measure. Such determination may include determining a z-score value based on the corresponding predicted next instance of manual driver trajectory data and the predicted next instance of autonomous vehicle control system trajectory Gaussian distribution; determining the z-score value satisfies one or more conditions; and in response determining the z-score value satisfies the one or more conditions, and determining to classify the corresponding predicted next instance of autonomous vehicle control system trajectory Gaussian distribution as a deviation.

In other implementations, wherein the predicted next instance is a Gaussian distribution, the method may include determining whether to classify the corresponding predicted next instance of autonomous vehicle control system trajectory data as a deviation. Such a determination may be based on the difference measure, including determining a z-score value based on the corresponding predicted next instance of manual driver trajectory data and the predicted next instance of autonomous vehicle control system trajectory Gaussian distribution;

determining the z-score value does not satisfy one or more conditions; and in response determining the z-score value does not satisfy the one or more conditions, determining to not classify the corresponding predicted next instance of autonomous vehicle control system trajectory data as a deviation. Additionally or alternatively, the method may further include, in response to determining to not classify the corresponding predicted next instance of autonomous vehicle control system trajectory data as a deviation; comparing (a) the corresponding predicted next instance of autonomous vehicle control system trajectory data to (b) a corresponding further instance of manual driver trajectory data, the corresponding further instance of manual driver trajectory data being previously captured during the control of the corresponding vehicle by the corresponding manual driver, and following the corresponding next instance of manual driving data; and determining an additional difference measure based on the comparing; and determining whether to classify the corresponding predicted next instance of autonomous vehicle control system trajectory data as a deviation based on the additional difference measure. Additionally or alternatively, the method may further include determining to classify the corresponding predicted next instance of autonomous vehicle control system trajectory data as a deviation based on the additional difference measure; and in response to determining to classify the corresponding predicted next instance of autonomous vehicle control system trajectory data as a deviation based on the additional difference measure, determining a latency between the corresponding instance of manual driver trajectory data and the corresponding further instance of manual driver trajectory data.

In other implementations the determination of whether to classify the predicted next instance as a deviation based on a difference measure may include determining to classify the corresponding predicted next instance of autonomous vehicle control system trajectory data as a deviation based on the difference measure; in response to determining to classify the corresponding predicted next instance of autonomous vehicle control system trajectory data as a deviation based on the difference measure, determining whether to classify the deviation as caused by the autonomous vehicle control system; and wherein evaluating the autonomous vehicle control system based on the difference measure from the plurality of iterations comprises evaluating the autonomous vehicle control system based the difference measure classified as caused by the autonomous vehicle control system from the plurality of iterations.

In still further implementations, determining to classify the corresponding predicted next instance of autonomous vehicle control system trajectory data as a deviation based on the difference measure may include determining a log likelihood value based on the corresponding predicted next instance of manual driver trajectory data and the predicted next instance of autonomous vehicle control system trajectory Gaussian distribution; determining the log likelihood value satisfies one or more conditions; and in response determining the log likelihood value satisfies the one or more conditions, determining to classify the corresponding predicted next instance of autonomous vehicle control system trajectory Gaussian distribution as a deviation.

In further implementations, a system described herein may include one or more processors that execute instructions, stored in an associated memory, the instructions when executed by the one or more processors, evaluate an autonomous vehicle control system. The system includes, for each of a plurality of iterations: identifying a corresponding current instance of manual driving data, the corresponding instance of manual driving data being previously captured during control of a corresponding vehicle by a corresponding manual driver and comprising: corresponding current vehicle trajectory data that defines one or more aspects of the trajectory of the corresponding vehicle for the corresponding current instance, and corresponding current environmental data that defines one or more aspects of an environment of the corresponding vehicle for the corresponding current instance. The system further includes processing the corresponding current instance of the manual driving data, using the autonomous vehicle control system, to generate a corresponding predicted next instance of autonomous vehicle control system trajectory data defining one or more aspects of a trajectory that would be implemented by the autonomous vehicle control system in view of the current instance of manual driving data. The system additionally includes comparing (a) the corresponding predicted next instance of autonomous vehicle control system trajectory data to (b) a corresponding next instance of manual driver trajectory data, the corresponding next instance of manual driver trajectory data being previously captured during the control of the corresponding vehicle by the corresponding manual driver, and following the corresponding current instance of manual driving data, and determining a difference measure based on the comparing. The system also includes evaluating the autonomous vehicle control system based on the difference measure from the plurality of iterations.

In implementations, the system may optionally include one or more of the following features.

In implementations, the system may further include determining, based on the evaluating of the autonomous vehicle control system, whether to deploy the autonomous vehicle control system in one or more autonomous vehicles.

In other implementations, the system may include for each of a plurality of additional iterations: identifying the corresponding current instance of manual driving data; processing the corresponding current instance of manual driving data, using an additional autonomous vehicle control system, to generate an additional corresponding predicted next instance of additional autonomous vehicle control system trajectory data defining one or more aspects of an additional trajectory that would be implemented by the additional autonomous vehicle control system in view of the current instance of manual driving data; comparing (a) the additional corresponding predicted next instance of additional autonomous vehicle control system trajectory data to (b) the corresponding next instance of manual driver trajectory data, the corresponding next instance of manual driver trajectory data being previously captured during the control of the corresponding vehicle by the corresponding manual driver, and following the corresponding current instance of manual driving data; determining an additional difference measure based on the comparing; and evaluating the additional autonomous vehicle control system based on the additional difference measure from the additional plurality of iterations.

In still further implementations, the corresponding current environment data that defines one or more aspects of the environment of the corresponding vehicle for the current instance may include sensor data captured using a sensor suite of the corresponding vehicle.

Further implementations describe herein set forth a non-transitory computer-readable storage medium storing instructions executable by one or more processors of a computing system to evaluate an autonomous vehicle control system by: for each of a plurality of iterations: identifying a corresponding current instance of manual driving data, the corresponding instance of manual driving data being previously captured during control of a corresponding vehicle by a corresponding manual driver and comprising: corresponding current vehicle trajectory data that defines one or more aspects of the trajectory of the corresponding vehicle for the corresponding current instance, and corresponding current environmental data that defines one or more aspects of an environment of the corresponding vehicle for the corresponding current instance; processing the corresponding current instance of the manual driving data, using the autonomous vehicle control system, to generate a corresponding predicted next instance of autonomous vehicle control system trajectory data defining one or more aspects of a trajectory that would be implemented by the autonomous vehicle control system in view of the current instance of manual driving data; comparing (a) the corresponding predicted next instance of autonomous vehicle control system trajectory data to (b) a corresponding next instance of manual driver trajectory data, the corresponding next instance of manual driver trajectory data being previously captured during the control of the corresponding vehicle by the corresponding manual driver, and following the corresponding current instance of manual driving data; determining a difference measure based on the comparing; and evaluating the autonomous vehicle control system based on the difference measure from the plurality of iterations.

In addition, some implementations include one or more processors (e.g., central processing unit(s) ("CPU"(s)), graphics processing unit(s) ("GPU"(s)), and/or tensor processing unit(s) ("TPU"(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
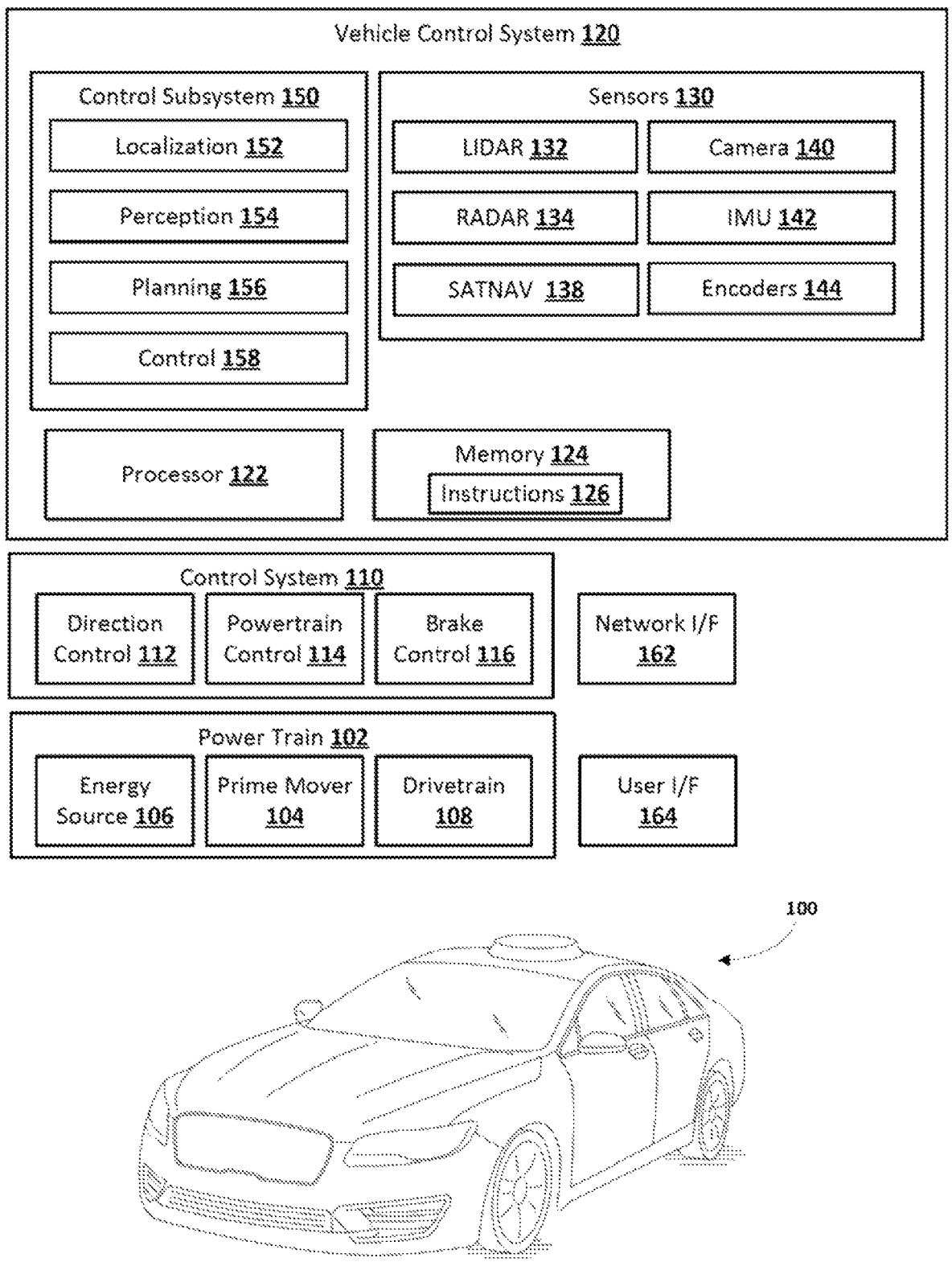
FIG. 1 illustrates an example environment in which implementations disclosed herein may be implemented.

Referring to FIG. 1, an example autonomous vehicle 100 within which the various techniques disclosed herein may be implemented. Vehicle 100, for example, may include a powertrain 102 including a prime mover 104 powered by an energy source 106 and capable of providing power to a drivetrain 108, as well as control system 110 including a direction control 112, a powertrain control 114, and brake control 116. Vehicle 100 may be implemented as any number of different types of vehicles, including vehicles capable of transporting people and/or cargo, and capable of traveling by land, by sea, by air, underground, undersea, and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. Drivetrain 108 include wheels and/or tires along with a transmission and/or any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators and/or sensors for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle 100. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, or construction equipment, will necessarily utilize different powertrains, drivetrains, energy sources, direction controls, powertrain controls and brake controls, as will be appreciated by those of ordinary skill having the benefit if the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include RADAR unit 134, LIDAR unit 132, a 3D positioning sensors 138, e.g., a satellite navigation system such as GPS, GLONASS, BeiDou, Galileo, Compass, etc.

The 3D positioning sensors 138 can be used to determine the location of the vehicle on the Earth using satellite signals. Sensors 130 can optionally include a camera 140 and/or an IMU 142. The camera 140 can be a monographic or stereographic camera and can record still and/or video images. The IMU 142 can include multiple gyroscopes and accelerometers capable of detecting linear and rotational motion of the vehicle in three directions. One or more encoders 144, such as wheel encoders may be used to monitor the rotation of one or more wheels of vehicle 100.

The outputs of sensors 130 may be provided to a set of control subsystems 150, including, a localization subsystem 152 (also referred to herein as a localization system, a localization system portion of a control system, etc.), a planning subsystem 156 (also referred to herein as a planning system, a planning system portion of a control system, etc.), a perception subsystem 154 (also referred to herein as a perception system, a perception system portion of a control system, etc.), and a control subsystem 158 (also referred to herein as a control system, a control system portion of a control system, etc.). Localization subsystem 152 is principally responsible for precisely determining the location and orientation (also sometimes referred to as "pose") of vehicle 100 within its surrounding environment, and generally within some frame of reference. The location of an autonomous vehicle can be compared with the location of an additional vehicle in the same environment as part of generating labeled autonomous vehicle data. Perception subsystem 154 is principally responsible for detecting, tracking, and/or identifying elements within the environment surrounding vehicle 100. Planning subsystem 156 is principally responsible for planning a trajectory for vehicle 100 over some timeframe given a desired destination as well as the static and moving objects within the environment. A machine learning model in accordance with several implementations can be utilized in planning a vehicle trajectory. Control subsystem 158 is principally responsible for generating suitable control signals for controlling the various controls in control system 120 in order to implement the planned trajectory of the vehicle 100. Similarly, a machine learning model can be utilized to generate one or more signals to control an autonomous vehicle to implement the planned trajectory.

It will be appreciated that the collection of components illustrated in FIG. 1 for vehicle control system 120 is merely exemplary in nature. Individual sensors may be omitted in some implementations. Additionally or alternatively, in some implementations multiple sensors of types illustrated in FIG. 1 may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 120 may be networked in various manners.

In some implementations, vehicle 100 may also include a secondary vehicle control system (not illustrated), which may be used as a redundant or backup control system for vehicle 100. In some implementations, the secondary vehicle control system may be capable of fully operating autonomous vehicle 100 in the event of an adverse event in vehicle control system 120, whine in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others. Furthermore, vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 162, suitable for communicating with one or more networks (e.g., a Local Area Network ("LAN"), a wide area network ("WAN"), a wireless network, and/or the Internet, among others) to permit the communication of information with other computers and electronic device, including, for example, a central service, such as a cloud service, from which vehicle 100 receives environmental and other data for use in autonomous control thereof. In many implementations, data collected by one or more sensors 130 can be uploaded to an external computing system via a communications network for additional processing. In some such implementations, a time stamp can be added to each instance of vehicle data prior to uploading. Additional processing of autonomous vehicle data by an external computing system in accordance with many implementations is described with respect to FIG. 3 and FIG. 4.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via a communications network, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art, having the benefit of the present disclosure, will recognize that the exemplary environment illustrated in FIG. 1 is not intended to limit implementations disclosed herein. Indeed, those skilled in the art will recognize that other alternative hardware and/or software environments may be used without departing from the scope of implementations disclosed herein.

Figure 2:
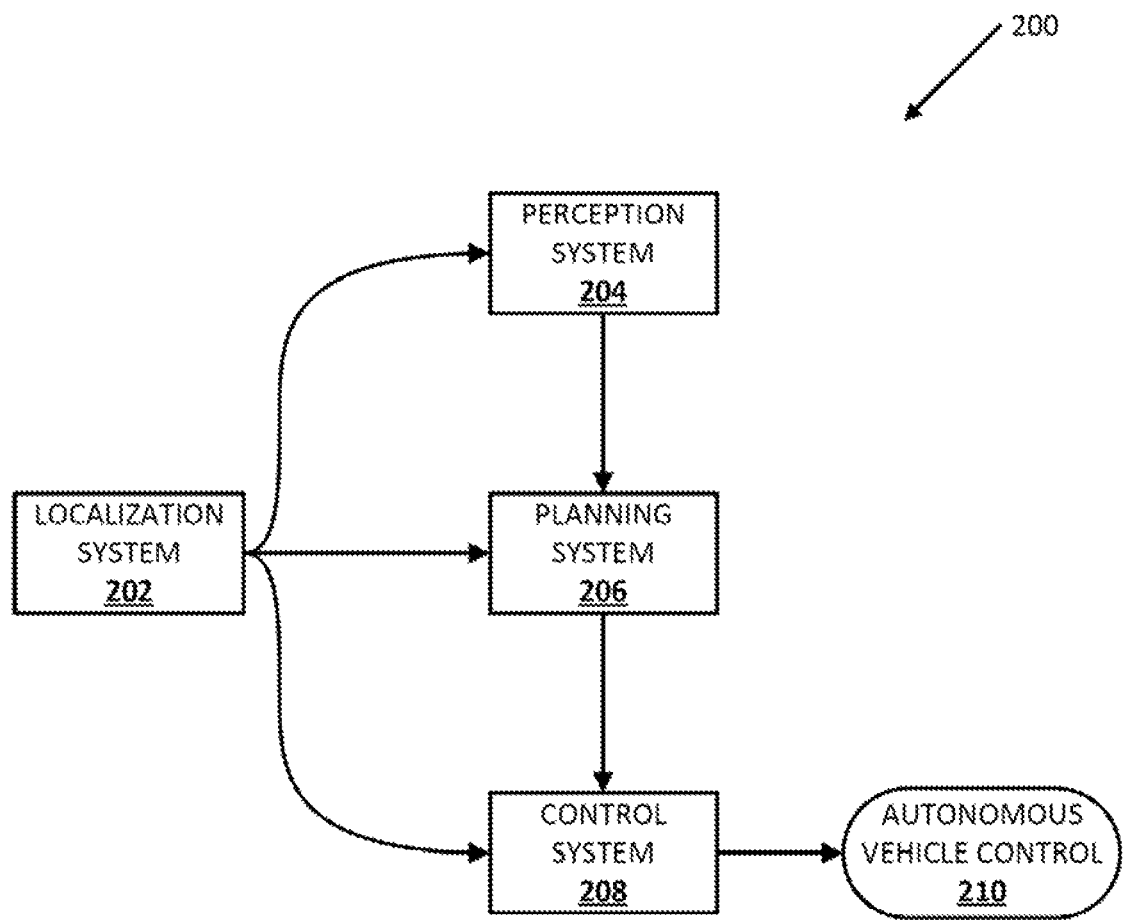
FIG. 2 illustrates a block diagram of an autonomous vehicle control system in which implementations disclosed herein may be implemented.

FIG. 2 illustrates autonomous vehicle control architecture 200 in accordance with many implementations. Architecture 200 includes localization system 202, perception system 204, planning system 206, and control system 208. Additional and/or alternative systems and/or subsystems (not depicted) can utilized in controlling an AV.

Localization system 202 can be utilized in determining a location and an orientation (i.e., a pose) of a vehicle within the environment including a map pose, a word pose, a local pose, and/or additional and/or alternative poses. In many implementations, a local pose can be determined using the localization system based on sensor data such as IMU data. Similarly, a world pose can provide the location and/or orientation of a vehicle on the Earth based on, for example GPS data. Additionally or alternatively, a map pose can provide the location and/or orientation of the vehicle on a provided map based on, for example LIDAR data. Localization system 202 can provide the map pose, the world pose, the local pose, and/or additional localization data to perception system 204, planning system 206, and/or control system 208.

Perception system 204 can detect, track, and/or identify objects in the environment with the AV. For example, perception system 204 can track objects using RADAR data, can track objects using LIDAR data, can track objects using camera data, can estimate traffic signals using camera data, and/or can perceive additional or alternative information about objects in the environment with the vehicle. In a variety of implementations, perception system 204 can pass detection data, tracking data, identification data, and/or additional perception data to planning system 206. For example, the perception system can detect an object, identify the object as a pedestrian, and/or track the identified pedestrian.

Planning system 206, using data determined by localization system 202, data determined by perception system 204, a local map, and/or additional data, can plan a trajectory of the vehicle, plan a route of the vehicle, and/or plan additional action(s) of the vehicle. Data determined using planning system 206 can be passed to control system 208.

Control system 208 can utilize data generated by localization system 202 as well as data generated by planning system 206 in generating control signal(s) to implement the route, the trajectory, and/or additional action(s) determined by planning system 206. In a variety of implementations, control system 208 can generate autonomous vehicle controls 210, such as control signal(s) for throttle control, brake control, steering control, parking control, and/or control of one or more additional electrical and/or electro-mechanical vehicle systems.

Figures 3A, 3B, 3C:
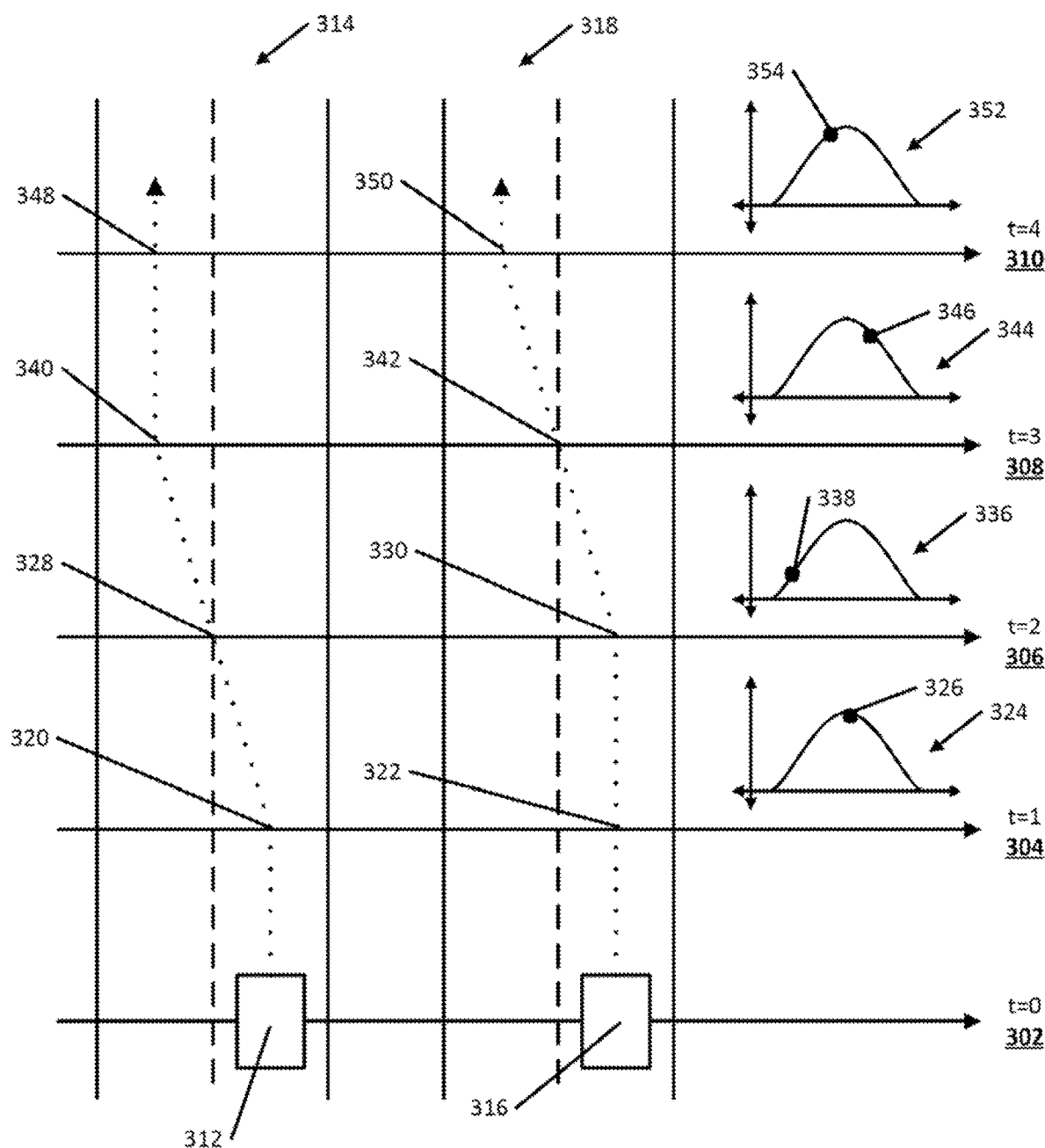
FIG. 3A illustrates an example predicted trajectory of a vehicle controlled by an autonomous vehicle control system in accordance with various implementations disclosed herein.
FIG. 3B illustrates an example trajectory of a vehicle controlled by a manual driver in accordance with various implementations disclosed herein.
FIG. 3C illustrates examples of determining whether there is a deviation between manual driving data and AV control system probability distributions in accordance with various implementations disclosed herein.

FIG. 3A illustrates a trajectory 314 predicted using an AV control system of AV 312 over several time steps. The trajectory of the AV is illustrated at time=0 302 (i.e., the current time step), time=1 304 (i.e., the first predicted time step) by point 320, time=2 306 (i.e., the second predicted time step) by point 328, time=3 308 (i.e., the third predicted time step) by point 340, and time=4 310 (i.e., the fourth predicted time step) by point 348. AV 312 is currently driving on a two lane road at t=0 302. In the illustrated example, the predicted trajectory 314 of AV 312 takes the vehicle from the right lane into the left lane of the two lane road. However, this trajectory is not meant to be limiting and a planning system can determine additional and/or alternative trajectories for the AV.

FIG. 3B illustrates a trajectory 318 of a vehicle 316 driven by a manual driver on the same road and at the same initial time=0 302 as AV 312 of FIG. 3A. A ground truth representation of the trajectory of the manual driver's actions is illustrated, including the ground truth representation of the trajectory at the first time step 322, the ground truth representation of the trajectory at the second time step 330, the ground truth representation of the trajectory at the third time step 342, and the ground truth representation of the trajectory at the fourth time step 350. In the illustrated example, the ground truth representation of the trajectory of the vehicle 316 driven by the manual driver takes the vehicle from the right lane into the left lane of a two lane road. However, this trajectory is not meant to be limiting and the manual driver can determine additional and/or alternative trajectories for the vehicle. Although AV 312 and vehicle 316 controlled by the manual driver begin driving on the same road at the same time, the predicted trajectory 314 of the AV 312 differs from the trajectory 318 of the vehicle 316 driven by the manual driver.

In some implementations, an AV control system can determine a probability distribution of candidate trajectories generated by the planning system of the AV, and can generate control signals based on the most likely trajectory. For example, the probability distribution can be a Gaussian distribution, an inverse Gaussian distribution, a Laplace distribution, or any distribution from exponential family, or a binomial distribution, and/or additional type(s) of distributions. Probability distributions of potential trajectories generated by the AV control system can be shaped by one or more cost functions of the AV system to make undesirable actions more costly and more desirable actions less costly. In some implementations, the AV control system can determine the trajectory of the AV based on multiple distributions, each distribution corresponding to different vehicle parameters. For example, the AV control system can determine, with contribution from the various cost functions, a distribution for jerk, a distribution for steering angle, a distribution for velocity and speed, and/or a distribution for additional vehicle parameter(s). Additionally or alternatively, the system can determine a multi variable distribution, such as a multi variable and/or multivariate distribution for jerk and steering angle at various time steps and/or for the whole trajectory. In implementations, according to one or more cost and/or value functions a number of AV candidate trajectories may be sampled for the predicted next instance of AV trajectory data. The resultant output of this sampling by the one or more cost functions may result in the probability distribution of potential trajectories creating the corresponding predicted next instance of autonomous vehicle control system trajectory data. The corresponding instance of manual driving data for the next time instance may be compared with the probability distribution of potential trajectories which form the predicted next instance of autonomous vehicle control system trajectory data.

FIG. 3C illustrates example distributions 324, 336, 346, and 352 generated using the AV control system. Although distributions 342, 336, 346, and 352 are all Gaussian distributions, this is not meant to be limiting, and other types of distributions can be generated using the AV control system. The predicted AV trajectory at t=1 (i.e., point 320 in the predicted AV trajectory 314) illustrated in FIG. 3A is based on probability distribution 324. The ground truth manual driving data at t=1 (i.e., at point 322 in the manual driver trajectory) is represented as point 326 in deviation 324. In some implementations, the system can determine whether a difference (if any) between the predicted AV control system trajectory and the manual driving data is a deviation at t=1 by determining a z-score value based on point 326 and deviation 324. Comparison between the predicted AV control system trajectory elements and the manual driving data may provide a proxy to determine how close the manual operations are to the AV calculated next trajectory command. Differences between the two, while not absolute in indicating an incorrect planning system trajectory, may indicate that cost functions applied to the planning system determined output may need updating. Further, comparisons between the two, the generated planning system trajectory distribution and the indicated manual driving data, are not meant to enforce a mimicking by the planning system of the manual driving data. Such differences merely may act as a signal that cost functions related to the calculated predicted next instance of autonomous vehicle control system trajectory data may need updating and/or decisions by the AV control system may need updating. Therefore, for at least one iteration, the AV control system may generate a predicted next instance of autonomous vehicle control system trajectory data which represents a probability distribution of potential trajectories, the probability distribution of potential trajectories resulting from application of at least one cost function to AV candidate trajectories generated by the AV control system. For each of such iteration, the AV control system compares the manual driving data with the predicted next instance of autonomous vehicle control system trajectory to determine a difference measure between the two. In implementations, the manual driving data represents actual trajectory values. In some implementations, these trajectory values may include jerk and steering angle.

Distribution 336 represents possible predicted AV actions determined for time step t=2, where distribution 336 is based on the environmental data and vehicle data portions of the manual driving data at time step t=0. The predicted AV trajectory at t=1 (i.e., point 328 in the predicted AV trajectory 314) illustrated in FIG. 3A is based on probability distribution 336. Ground truth manual driving data at t=2 (i.e., at point 330 in the manual driver trajectory 318) is indicated by point 338 in deviation 336. In some implementations, the system can determine whether a difference (if any) between the predicted AV control system trajectory and the manual driving data is a deviation at t=2 by determining a z-score value based on point 338 and deviation 336.

Similarly, distribution 344 represents possible predicted AV actions determined for time step t=3 based on manual driving data at t=0, and distribution 352 represents possible predicted AV actions determined for time step t=4 based on manual driving data at t=0. The ground truth manual driving data at t=3 is represented by point 346 in distribution 344, and the ground truth manual driving data at t=4 is represented by point 354 in distribution 352. The system can determine whether a difference (if any) between predicted AV control system trajectory and the manual driving data is a deviation at t=3 by determining a z-score value based on point 346 and deviation 344. Furthermore, the system can determine whether a difference (if any) between predicted AV control system trajectory and the manual driving data is a deviation at t=4 by determining a z-score value based on point 354 and deviation 352.

Environmental data can be dynamic thereby changing the various state variables interpreted by the autonomous vehicle and also affecting the captured manual driving data. For example, a person can stop walking down the sidewalk, a traffic light can change colors, the car in front of the vehicle can begin applying the brakes, etc. Each of these environment state variables may modify manual driving data at future time steps. An AV control system, in generating future predicted trajectories, is unable to account for these changes in the environment without processing the corresponding environmental data capturing the changes. Therefore, in some implementations, a deviation can be determined based only on the next time step (e.g., a deviation between manual driving data at t=0 is based only on the next instance of manual driving data at t=1 along with probability distribution 324 corresponding to t=1). Therefore, at each time step, the next instance of manual driving data is processed to determine another new probability distribution based on (potential) changes in the vehicle data and environmental data in the next instance of manual driving data compared to the previous instance of manual driving data. In some other implementations, a deviation can be determined based on several future time steps (e.g., a deviation between manual driving data at t=1 is based on distribution 324 at t=1, distribution 336 at t=2, distribution 344 at t=3, and distribution 352 at t=4). However, as indicated, such future time step determinations may be made without the benefit of required state values and thus determined deviations may be less important.

In many implementations, one or more cost functions of the AV control system may modify the shape of or move along an axis the distributions 324, 336, 346, and 352. Cost functions are a function of vehicle parameters as well as environmental parameters, such as the vehicle trajectory data portion and the environmental data portion of an instance of manual driving data. A first example cost function can be related to controlling the AV next to a curb. The cost function can shape the probability distribution such that it is more expensive for the AV control system to drive AV next to or closer to the curb and less expensive for the AV control system to drive the AV further away from the curb. For example, the curb cost function can shape the probability distribution (or alter the position of the probability distribution) such that it is more expensive for AV control system to drive the AV 1 inch from the curb and less expensive for the AV control system to drive the AV 6 inches from the curb. Due to the reduced expense, the AV control system can generate a predicted AV control system trajectory such that the AV is 6 inches from the curb. Modifying the shape of the distributions and/or moving the distributions along an axis means that the at least one cost function may shift the predicted next instance of AV trajectory data having the highest probability.

A corresponding instance of manual driving data can indicate the vehicle is manually driven 4 inches from the curb (i.e., the vehicle is manually driven closer to the curb than the AV control system is driving the AV). However, the difference between the manual driving data indicating the human is driving 4 inches from the curb and the predicted AV control system trajectory data indicating driving the AV 6 inches from the curb does not necessarily mean there will be a statistically significant deviation between the predicted AV control system trajectory data and the corresponding instance of manual driving data. Nor will such deviation mean that the various cost functions are incorrect and need updating. For example, a z-score value can be determined based on the manual driving the vehicle 4 inches from the curb with respect to the probability distribution shaped using the curb cost function. The z-score value indicates the number of standard deviations the manual driving data is away from the mean of the probability distribution. Here, the z-score value indicates how many standard deviations the manual driver driving 4 inches from the curb is from the mean of the probability distribution generated using the curb cost function. A low z-score value indicates the manual driving data is not a statistically significant deviation. For example, a z-score value of 0.25 indicates the difference is not statistically significant. Conversely, a high z-score value may indicate the manual driving data is a statistically significant deviation. For example, a z-score value of 4 indicates a statistically significant deviation. In some implementations, a deviation can indicate error(s) in how the cost function is shaping or moving the corresponding probability distribution for the calculated trajectory. Such a deviation may indicate the curb cost function is incorrectly shaping the probability distribution indicating how close to control the vehicle to the curb.

As another example, a cost function can relate to approaching a red traffic light. The AV control system should slow the vehicle down so the vehicle can eventually come to a stop at the red traffic light. Therefore, the red traffic light cost function can shape or move the probability distribution such that it is expensive for the AV control system to increase the acceleration of the AV (e.g., cause the AV to drive faster) as it approaches the red traffic light, and less expensive for the AV control system to decrease the acceleration of the AV (e.g., cause the AV to slow down) as it approaches the red traffic light. As described above, a z-score value can indicate whether there is a deviation between instances of manual driving data as a vehicle approaches a red light and predicted AV control system trajectory data generated based on the manual driving data. If there is a larger z-score value (i.e., indicating there is a deviation), it can indicate the red traffic light cost function is incorrectly shaping the probability distribution. If there is a smaller z-score value (i.e., indicating no deviation), it can indicate the red traffic light cost function is correctly shaping the probability distribution.

Conversely, a cost function can relate to approaching a green traffic light. It is uncertain if or when a traffic light will change from green to yellow (and potentially red) before a vehicle can drive through the intersection. Therefore, the AV control system should continue driving the AV towards the green traffic light, while avoiding rapidly accelerating the AV towards the green traffic light in case the AV needs to come to a complete stop before the intersection. The green traffic light cost function can shape or move the probability distribution such that it is expensive to increase the acceleration of the AV (e.g., speed up the AV) as it approaches the green traffic light, and such that it is less expensive to keep the AV at a constant acceleration (e.g., maintain the same speed of the AV) as it approaches the intersection. As described above, a z-score value can indicate whether there is a deviation between manual driving data as a manual driver approaches a green traffic light and predicted AV control system trajectory data based on the manual driving data. If there is a deviation, it can indicate the green traffic light cost function is incorrectly shaping the probability distribution. If there is not a deviation, it can indicate the green traffic light cost function is correctly shaping the probability distribution. Hence, determining a deviation between the two may act as a proxy representing cost functions may or may not need correction under certain conditions.

Figure 4:
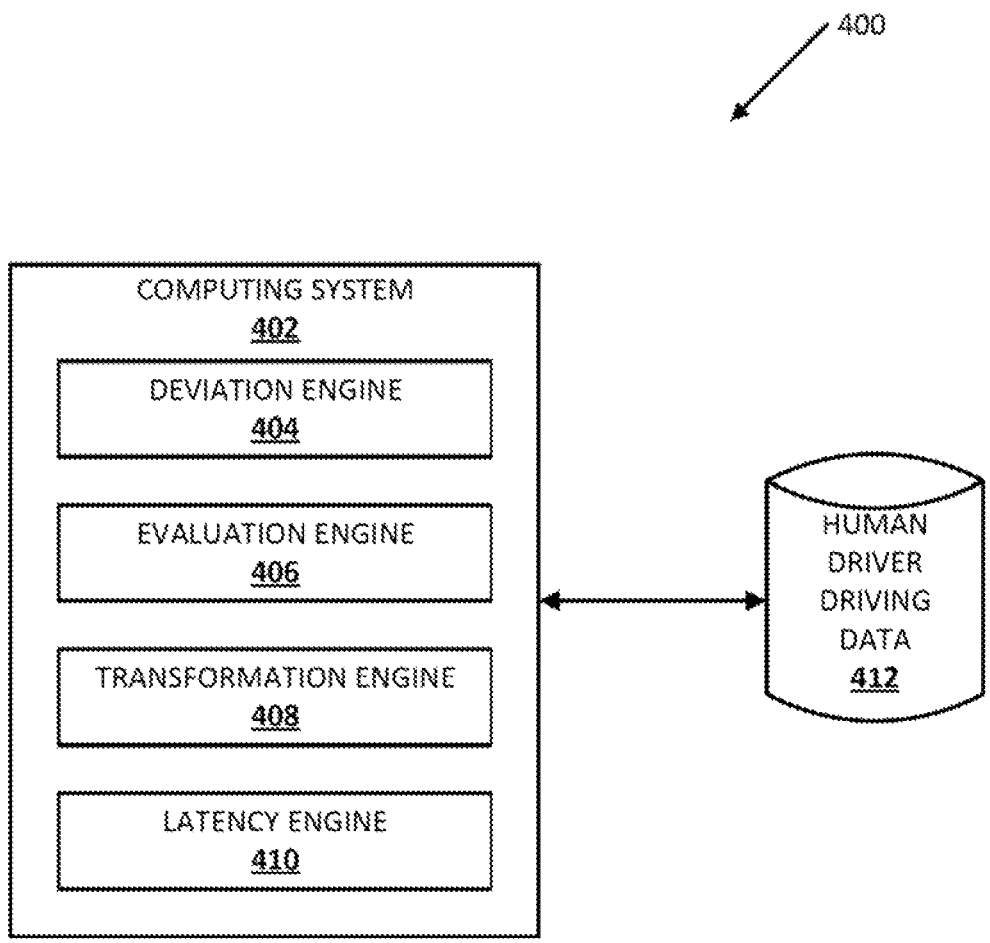
FIG. 4 illustrates an example computing system in which implementations disclosed herein may be implemented.

FIG. 4 illustrates an example 400 of a computing system which can be utilized to determine deviation(s) between manual driving data and AV trajectory data determined using a planning system of an AV in accordance with many implementations. Computing system 402 can receive manual driving data 412 captured using a sensor suite of a vehicle while a human is driving the vehicle. In many implementations, manual driving data 412 can be captured using an AV sensor suite of an autonomous vehicle while a human is driving the autonomous vehicle (i.e., the autonomous vehicle is driven by the manual driver and is not autonomously controlled). Additionally or alternatively, manual driving data 412 can be captured using a sensor suite mounted onto a non-autonomous vehicle. In various implementations, the sensor suite can include various car attribute data obtain from the CAN bus or from other car supplied sources. Such information can include information native to the automobile such as automobile control information, acceleration, speed, deceleration, turning radius and the like. Additionally or alternatively, this information can be obtained generally from sensors embedded within the automobile. In some implementations, the sensor suite may be mounted onto the non-autonomous vehicle and include the full sensor suite of an AV such as, for example, vision or camera data including infrared, RADAR, LIDAR, GPS location, proximity detection devices and other environmental sensors which obtain information about the environment in which the car is operating. In other implementations, the sensor suite mounted onto the non-autonomous vehicle contains fewer sensors than a full AV sensor suite. In the various examples, the sensor suite may be sufficient to obtain various vehicle data in order to obtain information related to the driving characters of the manual driver in addition to vehicle environment information. Such data may include acceleration data, braking data and distance information, evasive movement handling data and the like.

Computing system 402 includes deviation engine 404, evaluation engine 406, transformation engine 408, latency engine 410, and/or additional engine(s) (not depicted). Deviation engine 404, evaluation engine 406, transformation engine 408, and/or latency engine 410 are example components in which techniques described herein may interface. In general, the deviation engine 404 may be provided to process at least an instance of manual driving data to generate a predicted next instance of AV trajectory data in response to the entered data. The deviation engine 404 may additionally or alternatively compare such predicted next instance of AV trajectory data with corresponding next instances of manual driving data 412 to determine a difference between the two. The deviation engine may also determine if the predicted next instance of AV trajectory data is statistically different from actual manual driving performance, such as based on a z-score value based on the determined AV trajectory data and the manual driving data.

Similarly, the evaluation engine 406 may be implemented alone or in combination with deviation engine 404. The evaluation engine may compare deviations, generated by a deviation engine, of different versions of an AV control system. Generally, the evaluation engine may evaluate at least a planning system portion of an AV control system based on these deviations from differing versions or different control systems to provide an indication of AV control system response to a known set of manual driving data. Evaluation engine 406, as further described below, provides a method of comparison between two AV control systems, including at least the planning system portion, to known input data.

Transformation engine 408 may be utilized to transform position data and/or speed data captured in one or more instances of the manual driving data into the data space of the AV control system (e.g., transform the position data and/or speed data of the manual driving data into jerk data, steering rate angle data, etc. of the state space of the AV control system).

Latency engine 410 may be tasked with determining manual driving latency. Manual driving latency includes the delay between the time when an AV control system reacts to an environmental event and when the manual driver reacts to the same event. Such latency delay may be relevant in determining the likelihood of an instance of manual driving data based on a given instance of predicted AV control system trajectory data. Further, latency engine determined parameters may also provide the ability for exclusion of manual driving data outside of a predetermined threshold delay that may exist between manual driving data reactions to environmental circumstances and the AV control system trajectory data.

The operations performed by one or more engines 404, 406, 408, 410 of FIG. 4 may be distributed across multiple computing systems. In some implementations, one or more aspects of engines 404, 406, 408, 410 may be combined into a single system and/or one or more aspects may be implemented by an external computing system (depicted in FIG.

1). For example, in some of those implementations, aspects of deviation engine 404 may be combined with aspects of latency engine 410. Engines in accordance with many implementations may each be implemented in one or more computing devices that communicate, for example, through a communication network. A communication network may include a wide area network such as the Internet, one or more local area networks ("LAN"s) such as Wi-Fi LANs, mesh networks, etc., and one or more bus subsystems. A communication network may optionally utilize one or more standard communication technologies, protocols, and/or inter-process communication techniques. Other communication and processing techniques may include distributed computing and/or computer clustering in order to process larger amounts of data in parallel.

Computing system 402 can perform a variety of analytical processing on manual driving data 412. In several implementations, manual driving data 412 can include sequence(s) of data captured via a sensor suite of a vehicle while a manual driver is driving the vehicle. In some implementations, manual driving data 412 can be captured via a sensor suite of an autonomous vehicle while the vehicle is controlled by the manual driver (and is not autonomously controlled). Additionally or alternatively, manual driving data 412 can be captured via a sensor suite mounted onto a non-autonomous vehicle.

For example, manual driving data may include sensor and other data detailing various automobile characteristics, such as braking force applied given a distance from an object. Alternatively or additionally manual driving data may include acceleration data from a vehicle stop position to full velocity on the given roadway. Manual driving data may also include both braking characteristics and acceleration during stop and go traffic, for example. Manual driving data may further include car movement data between traffic lights. For example, the manual driving data may include braking and acceleration characteristics between traffic lights when a "RED" light is being approached. All such manual driving data may be recorded detailing how a person driving the vehicle handles the vehicle in various circumstances, such as encounters with pedestrians, other cars or cyclists, as well as differing environmental conditions such as rain.

Each instance of manual driving data 412 can include vehicle trajectory data defining aspect(s) of the current trajectory of the vehicle (e.g., location, path, and/or additional trajectory data); environmental data defining aspect(s) of the current environment of the vehicle (e.g., LIDAR data capturing the environment of the vehicle, RADAR data capturing the environment of the vehicle, image(s) captured using a camera capturing the environment of the vehicle, and/or additional environmental data); and/or additional data. In a variety of implementations, manual driving data 412 captures sequence(s) of one or more manual drivers controlling a vehicle. For instance, manual driving data 412 can include sequences of the same driver driving in the same location; sequences of the same driver driving in different locations; sequences of different drivers driving in the same location; and/or sequences of different drivers driving in different locations.

Deviation engine 404 can be utilized to determine one or more deviations between the set of manual driving data 412 (including the vehicle trajectory data and environmental data) and AV trajectory data generated using an AV control system based on the manual driving data. Deviation engine 404 may also be utilized to generate AV control system trajectory data given the sensed environmental conditions around the vehicle being controlled by a manual driver (e.g., the environmental data portion of the manual driving data). For example, while a manual driver is driving through various environmental conditions, such as traffic, the manual operations to control the vehicle are recorded as a portion of the manual driving data. Variations between the actual manual driving data (i.e., the vehicle trajectory data portion of the manual driving data) and the predicted AV trajectory generated by the AV control system based on the actual manual driving may provide the basis of determining deviations.

In many implementations, deviation engine 404 can process an instance of the manual driving data 412 using an AV control system to generate a predicted next instance of AV control system trajectory data. In many implementations, deviation engine 404 can process one or more previous instances of manual driving data in addition to the instance of manual driving data (and/or one or more portions of the previous instance(s) of the manual driving data) using the AV control system to generate the predicted next instance of AV control system trajectory data. Some information such as whether a pedestrian is walking or running may not be accurately represented as an instantaneous current instance of manual driving data. Deviation engine 404 can process the current instance of manual driving data along with, for example, the three previous instances of manual driving data to better reflect whether a pedestrian is walking or running. Additionally or alternatively, an environmental object, such as an approaching stop sign may be occluded in a current instance of manual driving data but is not occluded in previous instance(s) of the manual driving data. Processing previous instance(s) of manual driving data along with the current instance of manual driving data can result in a predicted next instance of AV control system trajectory data that better reflects the full knowledge available to the human at the current instance (and similarly would be available to the AV control system in the same situation).

Furthermore, deviation engine 404 can compare the predicted next instance of AV control system trajectory data generated based on the current instance of manual driving data with a next instance of manual driving data to determine whether there is a difference between the predicted next instance of AV trajectory data and the next instance of manual driving data. Additionally or alternatively, deviation engine 404 can determine whether a difference between the next instance of manual driving data and predicted next instance of AV trajectory data is statistically significant. When an apparent statistically significant difference exists between the predicted next instance of AV trajectory data and recorded manual driving data, the deviation engine 404 can determine whether there is a deviation between the data. For example, deviation engine 404 can process the predicted next instance of AV trajectory data and the corresponding manual driving data using a z-score process, a log likelihood process, and/or an additional process to determine whether a difference is statistically significant. A z-score is a numerical measurement used to calculate a value's relationship to the mean of a group of values, measured in terms of standard deviations from the mean. If a z-score is 0, it indicates the data point's score is identical to the mean score. Additionally or alternatively, a z-score of 1.0 would indicate a value that is one standard deviation from the mean. In many implementations, z-scores can be positive or negative, with a positive value indicating the score is above the mean and a negative value indicating the score is below the mean. In a variety of implementations, a z-score value can be determined based on the difference between the next instance of manual driving data and the predicted next instance of AV control system trajectory data.

Evaluation engine 406 can be utilized to evaluate at least a planning system portion of an AV control system based on deviations determined using deviation engine 404. In a variety of implementations, evaluation engine 406 can determine an evaluation metric corresponding to at least the planning system portion of the AV control system based on the deviations. For example, an evaluation metric can be based on the total number of determined deviations between a known manual driving data set and the projected trajectory of a version of an AV planning system. The calculated metric may also be based on the number of deviations compared with the number of instances of manual driving data processed using the deviation engine, and/or based on additional metric(s).

In a variety of implementations, evaluation engine 406 can evaluate two (or more) versions of an AV control system based on deviations determined using the same (or substantially similar) set of manual driving data. For example, deviation engine 404 can generate a first set of deviations by processing AV control system version 5.6 with a set of manual driving data. Deviation engine 404 can also generate a second set of deviations by processing AV control system version 5.7 with the same set of manual driving data, where AV control system version 5.7 is an updated version of AV control system version 5.6. Evaluation engine 406 can evaluate AV control system version 5.6 with respect to AV control system version 5.7 based on the first set of deviations and the second set of deviations. For instance, if evaluation engine 406 determines a larger number of deviations in the second set of deviations, it can determine the changes made in AV control system version 5.7 do not improve the AV control system. Additionally or alternatively, if evaluation engine 406 determines a smaller number of deviations in the second set of deviations, it can determine the changes made in AV control system do improve the AV control system.

In a variety of implementations, evaluation engine 406 can determine whether to recommend deploying the AV control system based on the evaluation. For example, evaluation engine 406 can recommend to deploy AV control system with an evaluation satisfying a threshold value (e.g., determine to deploy an AV control system with an evaluation value over a defined value).

Transformation engine 408 can transform one or more aspects of manual driving data 412 into a state space of the AV control system. For example, a vehicle trajectory data portion of an instance of manual driving data 412 can include position data and/or speed data. The position data and/or speed data can be transformed into jerk data and/or steering rate angle data (i.e., transformed into the state space of the AV). Deriving acceleration and/or jerk data from position and/or speed data can introduce noise into the derived acceleration and/or jerk data. In many implementations, transformation engine 408 can use a vehicle dynamics model (not depicted) to smooth derived data to remove noise introduced into the data when transforming the manual driving data into the state space of the AV control system. Additionally or alternatively, human latency can be a dynamic value where the length of the latency is different at different times. For example, a manual driver may take longer to react to a traffic light changing green when a pedestrian is walking near the driver's vehicle on a sidewalk (i.e., the pedestrian may draw the manual driver's attention and the driver doesn't notice the traffic light changing green as quickly). In many implementations, latency engine 410 can determine a latency for each predicted next instance of AV control system trajectory data.

A manual driver can take longer to react to the environment compared to an AV control system. For example, after a traffic light changes to yellow, it can take a manual driver longer to begin applying the brakes of a vehicle than it can take an AV control system, in the same situation, to generate control signal(s) to begin to apply the brakes of the vehicle. Latency engine 410 can be utilized to determine a manual driving latency (i.e., the delay between the AV control system reacting to an event and the manual driver reacting to the same event). In many implementations, latency engine 410 can determine the likelihood of an instance of manual driving data based on a given instance of predicted AV control system trajectory data. For example, the likelihood can be determined by processing instance(s) of manual driving data and instance(s) of predicted AV control system trajectory data using a log likelihood process. Peaks in the likelihood data can provide an indication of an incorrectly offset latency. When peaks in the likelihood data are found, latency engine 410 can determine an additional likelihood of the instance of manual driving data based on a previous instance of predicted AV control system trajectory data. This can continue until latency engine 410 identifies a previous instance of predicted AV control system trajectory data without peaks in the likelihood data when compared with the instance of manual driving data. Latency engine 410 can determine the latency based time between the identified instance of predicted AV control system trajectory data and the instance of manual driving data. For example, a manual driver may take longer to react to a traffic light changing green when a pedestrian is walking near the driver's vehicle on a sidewalk (i.e., the pedestrian may draw the manual driver's attention and the driver doesn't notice the traffic light changing green as quickly). In many implementations, latency engine 410 can offset future instances of manual driving data when determining deviations between the corresponding AV control system and that manual driver.

Figure 5:
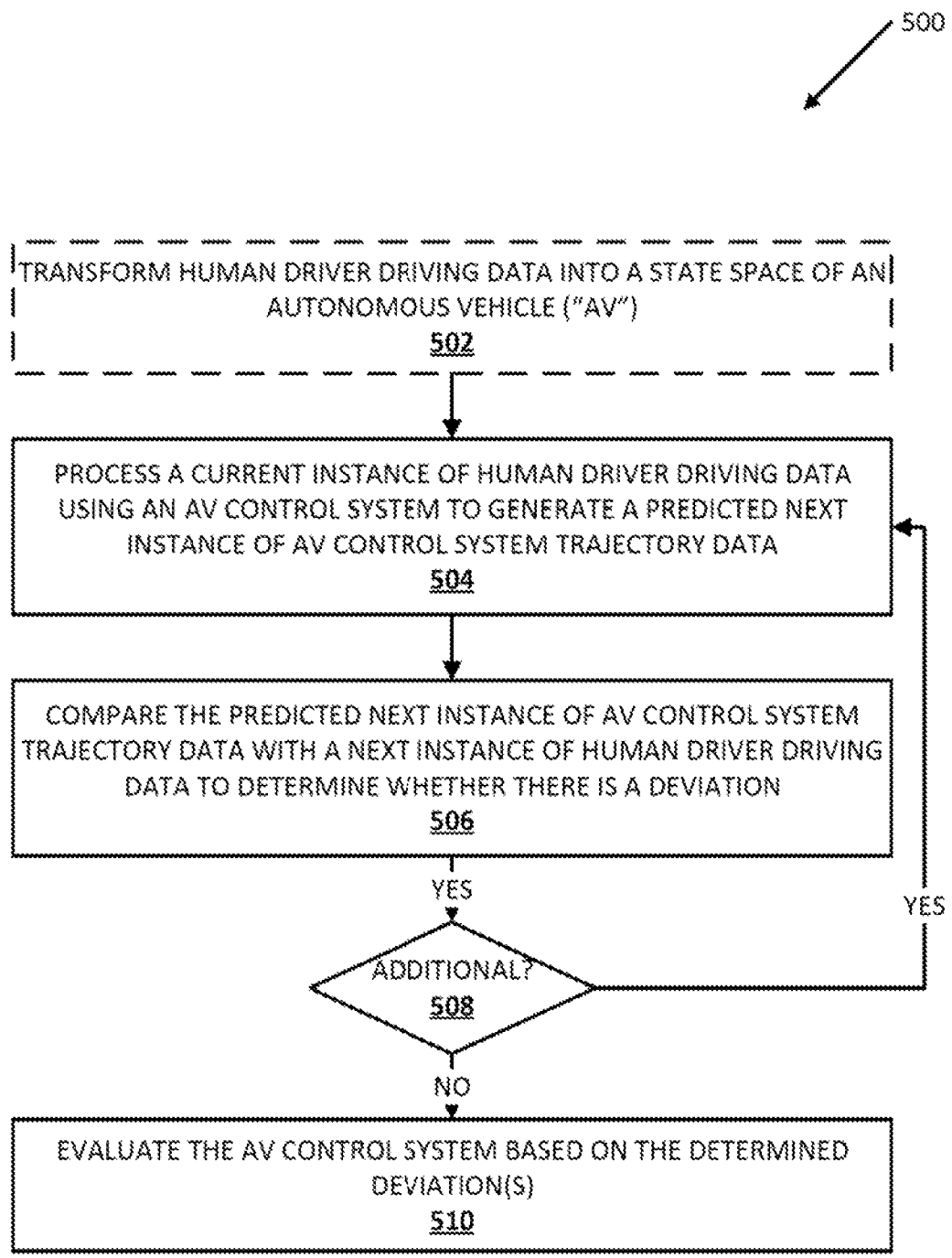
FIG. 5 is a flowchart illustrating an example process of performing selected aspects of the present disclosure, in accordance with various implementations.

Referring to FIG. 5, an example process 500 for practicing selected aspects of the present disclosure in accordance with various implementations is disclosed. For convenience, the operations of the flowchart are described with reference to a system that performs the operations. This system may include various components of various devices, including those described in FIG. 1 and/or FIG. 4. Moreover, while operations of process 500 are shown in a particular order, this is not meant to be limiting. One or more operations, elements, and/or steps may be reordered, omitted, and/or added.

At block 502, the system optionally transforms manual driving data into a state space of an AV control system. As described with respect to transformation engine 408 of FIG. 4, the system can transform position data and/or speed data captured in one or more instances of the manual driving data into the data space of the AV control system (e.g., transform the position data and/or speed data of the manual driving data into jerk data, steering rate angle data, etc. of the state space of the AV control system).

At block 504, the system processes a current instance of manual driving data using an AV control system to generate a predicted next instance of AV control system trajectory data. In many implementations, each instance of the manual driving data can include: (1) current vehicle trajectory data that captures one or more aspects of the vehicle's trajectory, and (2) current environmental data that captures one or more aspects of the environment of the vehicle. In some implementations, the predicted next instance of AV control system trajectory data is a probability distribution shaped or positioned as a result of various cost functions, where the most likely trajectory in the distribution is selected as the trajectory for the AV at the next instance.

At block 506, the system compares the predicted next instance of AV control system trajectory data with a next instance of manual driving data, such as a vehicle trajectory data portion of the next instance of manual driving data, to determine whether there is a deviation. For example, the system can determine a z-score value based on the cost modified probability distribution of the predicted next instance of AV control system trajectory data and the next instance of manual driving data. The system can then determine whether there is a deviation based on the z-score value. For example, the system can determine there is a deviation when the z-score value is greater than 1, when the z-score value is greater than 2, etc. In some implementations, the system can determine a difference between the predicted next instance of AV control system trajectory and the next instance of manual driving data without determining the difference is a statistically significant deviation. In some other implementations, the system can determine the difference between the predicted next instance of AV control system trajectory data and the next instance of manual driving data is statistically significant, and thus can determine a deviation between the data. In many implementations, the system can determine whether there is a deviation using deviation engine 404 of FIG. 4.

At block 508, the system determines whether an additional instance of manual driving data will be processed. If so, the system proceeds back to block 504 and processes an additional instance of manual driving data before proceeding to blocks 506 and 508. For example, the system can process the instance of manual driving data immediately following the current instance of manual driving data in a sequence of manual driving data. Additionally or alternatively, the system can the process an instance of manual driving data from an additional sequence such as manual driving data capturing the driver driving the vehicle in a different location, manual driving data capturing a different driver, and/or additional manual driving data. If the system determines to not process any additional instances of manual driving data, the system proceeds to block 510.

At block 510, the system evaluates the AV control system based on the determined deviation(s). For example, the AV control system can be evaluated based on the total number of deviations determined between the manual driving data and the AV control system trajectory data. Additionally or alternatively, the AV control system can be evaluated with respect to an additional AV control system by evaluating each AV control system with respect to the same (or substantially similar, e.g., 99% similar, 90% similar, etc.) set of manual driving data. In many implementations, the system can determine whether to deploy the AV control system in autonomous vehicle(s) based on the evaluation. In several implementations, the system can evaluate the AV control system using evaluating engine 406 of FIG. 4.

In some implementations, the evaluation may be evaluation of the current instance of manual driving data compared with the AV control system trajectory data. Instance evaluation of the AV control system, where a determined difference is significant, may mean that the associated cost functions which shaped the probability distribution of potential AV trajectories, may need to be updated or reviewed. The system may then record data location instances wherein statistically relevant deviations were found. In some other implementations, one or more cost functions may have shaped the possible AV trajectories and such record location instances wherein statistically relevant deviations are noted may also be recorded. In either instance, review of the relevant cost functions and/or other control decisions and possible update may be warranted.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed:

1. A method for evaluating an autonomous vehicle control system using previously captured manual driving data, the method implemented by one or more processors and comprising:
   capturing multiple instances of manual driving data captured from a vehicle which is manually driven in a conventional mode;
   storing the multiple instances of manual driving data;
   subsequent to the storing of the multiple instances of manual driving data,
   for each of a plurality of iterations:
      identifying a corresponding first instance of manual driving data captured at a first time step, the corresponding first instance of manual driving data being previously captured during control of a corresponding vehicle by a corresponding manual driver and comprising:
         corresponding current vehicle trajectory data that defines one or more aspects of a trajectory of the corresponding vehicle controlled by the corresponding manual driver at the first time step for the corresponding first instance, and
         corresponding current environmental data that defines one or more aspects of an environment of the corresponding vehicle controlled by the corresponding manual driver at the first time step for the corresponding first instance;
      processing the corresponding first instance of the manual driving data at the first time step, using the autonomous vehicle control system, to generate a corresponding predicted next instance of autonomous vehicle control system trajectory data defining one or more aspects of a predicted trajectory that would be implemented by the autonomous vehicle control system at a second time step right after the first time step;

comparing (a) the corresponding predicted next instance of autonomous vehicle control system trajectory data at the second time step to (b) a corresponding next instance of manual driver trajectory data, the corresponding next instance of manual driver trajectory data being previously captured at the second time step during the control of the corresponding vehicle by the corresponding manual driver, and following the corresponding first instance of manual driving data at the first time step;

determining a difference measure based on the comparing; and evaluating the autonomous vehicle control system based on the difference measure from the plurality of iterations;

modifying at least one cost function of the autonomous vehicle control system based on the evaluation.

2. The method of claim 1, further comprising:
determining, based on the evaluating of the autonomous vehicle control system, whether to deploy the autonomous vehicle control system in one or more autonomous vehicles.

3. The method of claim 1, further comprising:
for each of a plurality of additional iterations:
identifying the corresponding first instance of manual driving data;

processing the corresponding first instance of manual driving data, using an additional autonomous vehicle control system, to generate an additional corresponding predicted next instance of additional autonomous vehicle control system trajectory data defining one or more aspects of an additional trajectory that would be implemented by the additional autonomous vehicle control system in view of the first instance of manual driving data;

comparing (a) the additional corresponding predicted next instance of additional autonomous vehicle control system trajectory data to (b) the corresponding next instance of manual driver trajectory data, the corresponding next instance of manual driver trajectory data being previously captured during the control of the corresponding vehicle by the corresponding manual driver, and following the corresponding first instance of manual driving data;

determining an additional difference measure based on the comparing; and evaluating the additional autonomous vehicle control system based on the additional difference measure from the additional plurality of iterations.

4. The method of claim 1, wherein the corresponding current environmental data that defines one or more aspects of the environment of the corresponding vehicle for the first instance includes sensor data captured using a sensor suite of the corresponding vehicle.

5. The method of claim 1, wherein the corresponding current vehicle trajectory data that defines the one or more aspects of the trajectory of the corresponding vehicle for the first instance includes one or more aspects of the trajectory of the corresponding vehicle for one or more previous instances.

6. The method of claim 1, wherein the corresponding current environmental data that defines the one or more aspects of the environment of the corresponding vehicle for the first instance includes one or more aspects of the environment of the corresponding vehicle for one or more previous instances.

7. The method of claim 1, further comprising:
determining whether to classify the corresponding predicted next instance of autonomous vehicle control system trajectory data as a deviation based on the difference measure.

8. The method of claim 7, wherein the corresponding predicted next instance of autonomous vehicle control system trajectory data is a predicted next instance of autonomous vehicle control system trajectory based on a Gaussian distribution.

9. The method of claim 8, wherein determining whether to classify the corresponding predicted next instance of autonomous vehicle control system trajectory data as a deviation based on the difference measure comprises:

determining a z-score value based on the corresponding predicted next instance of manual driver trajectory data and the predicted next instance of autonomous vehicle control system trajectory based on the Gaussian distribution;

determining the z-score value satisfies one or more conditions; and in response determining the z-score value satisfies the one or more conditions, determining to classify the corresponding predicted next instance of autonomous vehicle control system trajectory Gaussian distribution as a deviation.

10. The method of claim 8, wherein determining whether to classify the corresponding predicted next instance of autonomous vehicle control system trajectory data as a deviation based on the difference measure comprises:

determining a z-score value based on the corresponding predicted next instance of manual driver trajectory data and the predicted next instance of autonomous vehicle control system trajectory based on the Gaussian distribution;

determining the z-score value does not satisfy one or more conditions; and in response to determining the z-score value does not satisfy the one or more conditions, determining to not classify the corresponding predicted next instance of autonomous vehicle control system trajectory data as a deviation.

11. The method of claim 10, further comprising:
in response to determining to not classify the corresponding predicted next instance of autonomous vehicle control system trajectory data as a deviation;

comparing (a) the corresponding predicted next instance of autonomous vehicle control system trajectory data to (b) a corresponding further instance of manual driver trajectory data, the corresponding further instance of manual driver trajectory data being previously captured during the control of the corresponding vehicle by the corresponding manual driver, and following the corresponding next instance of manual driving data; and determining an additional difference measure based on the comparing; and determining whether to classify the corresponding predicted next instance of autonomous vehicle control system trajectory data as a deviation based on the additional difference measure.

12. The method of claim 11, further comprising:
determining to classify the corresponding predicted next instance of autonomous vehicle control system trajectory data as a deviation based on the additional difference measure; and
in response to determining to classify the corresponding predicted next instance of autonomous vehicle control system trajectory data as a deviation based on the additional difference measure, determining a latency between the corresponding instance of manual driver trajectory data and the corresponding further instance of manual driver trajectory data.

13. The method of claim 7, further comprising:
determining to classify the corresponding predicted next instance of autonomous vehicle control system trajectory data as a deviation based on the difference measure;
in response to determining to classify the corresponding predicted next instance of autonomous vehicle control system trajectory data as a deviation based on the difference measure, determining whether to classify the deviation as caused by the autonomous vehicle control system; and
wherein evaluating the autonomous vehicle control system based on the difference measure from the plurality of iterations comprises evaluating the autonomous vehicle control system based on the difference measure classified as caused by the autonomous vehicle control system from the plurality of iterations.

14. The method of claim 8, wherein determining to classify the corresponding predicted next instance of autonomous vehicle control system trajectory data as a deviation based on the difference measure comprises:
determining a log likelihood value based on the corresponding predicted next instance of manual driver trajectory data and the predicted next instance of autonomous vehicle control system trajectory based on the Gaussian distribution;
determining the log likelihood value satisfies one or more conditions; and
in response to determining the log likelihood value satisfies the one or more conditions, determining to classify the corresponding predicted next instance of autonomous vehicle control system trajectory Gaussian distribution as a deviation.

15. A system including one or more processors that execute instructions, stored in an associated memory, the instructions when executed by the one or more processors evaluate an autonomous vehicle control system using previously captured manual driving data, comprising:
capturing multiple instances of manual driving data captured from a vehicle which is manually driven;
storing the multiple instances of manual driving data;
subsequent to the storing of the multiple instances of manual driving data, for each of a plurality of iterations:
identifying a corresponding first instance of manual driving data captured at a first time step, the corresponding first instance of manual driving data being previously captured during control of a corresponding vehicle by a corresponding manual driver and comprising:
corresponding current vehicle trajectory data that defines one or more aspects of a trajectory of the corresponding vehicle controlled by the corresponding manual driver at the first time step for the corresponding first instance, and
corresponding current environmental data that defines one or more aspects of an environment of the corresponding vehicle controlled by the corresponding manual driver at the first time step for the corresponding first instance;
processing the corresponding first instance of the manual driving data at the first time step, using the autonomous vehicle control system, to generate a corresponding predicted next instance of autonomous vehicle control system trajectory data defining one or more aspects of a predicted trajectory that would be implemented by the autonomous vehicle control system at a second time step right after the first time step;
comparing (a) the corresponding predicted next instance of autonomous vehicle control system trajectory data at the second time step to (b) a corresponding next instance of manual driver trajectory data, the corresponding next instance of manual driver trajectory data being previously captured at the second time step during the control of the corresponding vehicle by the corresponding manual driver, and following the corresponding first instance of manual driving data at the first time step;
determining a difference measure based on the comparing; and
evaluating the autonomous vehicle control system based on the difference measure from the plurality of iterations;
modifying at least one cost function of the autonomous vehicle control system based on the evaluation.

16. The system of claim 15, further comprising:
determining, based on the evaluating of the autonomous vehicle control system, whether to deploy the autonomous vehicle control system in one or more autonomous vehicles.

17. The system of claim 15, further comprising:
for each of a plurality of additional iterations:
identifying the corresponding first instance of manual driving data;
processing the corresponding first instance of manual driving data, using an additional autonomous vehicle control system, to generate an additional corresponding predicted next instance of additional autonomous vehicle control system trajectory data defining one or more aspects of an additional trajectory that would be implemented by the additional autonomous vehicle control system in view of the first instance of manual driving data;
comparing (a) the additional corresponding predicted next instance of additional autonomous vehicle control system trajectory data to (b) the corresponding next instance of manual driver trajectory data, the corresponding next instance of manual driver trajectory data being previously captured during the control of the corresponding vehicle by the corresponding manual driver, and following the corresponding first instance of manual driving data;
determining an additional difference measure based on the comparing; and
evaluating the additional autonomous vehicle control system based on the additional difference measure from the additional plurality of iterations.

18. The system of claim 15, wherein the corresponding current environmental data that defines one or more aspects of the environment of the corresponding vehicle for the first instance includes sensor data captured using a sensor suite of the corresponding vehicle.

19. A non-transitory computer-readable storage medium comprising instructions executable by one or more processors of a computing system to evaluate an autonomous vehicle control system using previously captured manual driving data, by:
    capturing multiple instances of manual driving data captured from a vehicle which is manually driven;
    storing the multiple instances of manual driving data;
    for each of a plurality of iterations:
        identifying a corresponding first instance of manual driving data captured at a first time step, the corresponding first instance of manual driving data being previously captured during control of a corresponding vehicle by a corresponding manual driver and comprising:
            corresponding current vehicle trajectory data that defines one or more aspects of a trajectory of the corresponding vehicle controlled by the corresponding manual driver at the first time step for the corresponding first instance, and
            corresponding current environmental data that defines one or more aspects of an environment of the corresponding vehicle controlled by the corresponding manual driver at the first time step for the corresponding first instance;
        processing the corresponding first instance of the manual driving data at the first time step, using the autonomous vehicle control system, to generate a corresponding predicted next instance of autonomous vehicle control system trajectory data defining one or more aspects of a predicted trajectory that would be implemented by the autonomous vehicle control system at a second time step right after the first time step;
        comparing (a) the corresponding predicted next instance of autonomous vehicle control system trajectory data at the second time step to (b) a corresponding next instance of manual driver trajectory data, the corresponding next instance of manual driver trajectory data being previously captured at the second time step during the control of the corresponding vehicle by the corresponding manual driver, and following the corresponding first instance of manual driving data at the first time step;
        determining a difference measure based on the comparing; and
    evaluating the autonomous vehicle control system based on the difference measure from the plurality of iterations;
    modifying at least one cost function of the autonomous vehicle control system based on the evaluation.

* * * * *